(12) United States Patent
Perini

(10) Patent No.: US 9,908,700 B2
(45) Date of Patent: Mar. 6, 2018

(54) STORING UNIT FOR CARDBOARD TUBES AND METHOD FOR STORING CARDBOARD TUBES

(71) Applicant: FUTURA S.P.A., Capannori, Fraz. Guamo (IT)

(72) Inventor: Fabio Perini, Viareggio (IT)

(73) Assignee: FUTURA S.P.A., Guamo (IT)

( * ) Notice: Subject to any disclaimer, the term of this patent is extended or adjusted under 35 U.S.C. 154(b) by 0 days.

(21) Appl. No.: 15/120,284

(22) PCT Filed: Feb. 17, 2015

(86) PCT No.: PCT/IT2015/000043
§ 371 (c)(1),
(2) Date: Aug. 19, 2016

(87) PCT Pub. No.: WO2015/125169
PCT Pub. Date: Aug. 27, 2015

(65) Prior Publication Data
US 2017/0073160 A1    Mar. 16, 2017

(30) Foreign Application Priority Data

Feb. 24, 2014    (IT) ................. FI2014A0041

(51) Int. Cl.
| B65G 1/08 | (2006.01) |
| B65G 47/51 | (2006.01) |
| B65G 17/12 | (2006.01) |

(52) U.S. Cl.
CPC ............. B65G 1/08 (2013.01); B65G 17/12 (2013.01); B65G 47/5104 (2013.01); B65G 2201/0217 (2013.01); B65G 2201/0276 (2013.01)

(58) Field of Classification Search
CPC ... B65G 47/5109; B65G 47/5113; B65G 1/08
(Continued)

(56) References Cited

U.S. PATENT DOCUMENTS 2,726,753 A * 12/1955 Bee .................... B65G 1/06
211/122
4,043,444 A * 8/1977 Bobeczko .......... B65G 47/5109
181/200
(Continued)

FOREIGN PATENT DOCUMENTS

JP           S56 113603 A       9/1981

*Primary Examiner* — Kaitlin S Joerger
(74) *Attorney, Agent, or Firm* — McGlew and Tuttle, P.C.

(57) ABSTRACT

A method for storing cardboard tubes (2) in a storing unit according to the present invention comprising the following steps: providing a storage unit with an input section for the tubes (2), a storage section (AC) comprising a plurality of storing planes (13), an output section for the tubes (2), transfer means (3) for transferring the tubes (2) from the input section to the storage section, and discharge means for conveying the tubes (2) from the storing section to the output section; providing a plurality of cardboard tubes (2) in the input section (E) of said storage unit; transferring the tubes (2) from the input section of the storage unit to the storage section; storing a plurality of tubes (2) in said storage section (AC); transferring the tubes (2) from said storage section (AC) to said output section. The step of transferring the tubes (2) from said input section to said storage section involves more tubes (2) simultaneously, whereby a plurality of tubes (2) are transferred from said input section simultaneously on a plurality of storing planes (13) of the storage section (AC).

17 Claims, 4 Drawing Sheets

(58) Field of Classification Search
USPC .................... 414/193; 198/347.1, 347.3, 594
See application file for complete search history.

(56) References Cited

U.S. PATENT DOCUMENTS

| | | | | |
|---|---|---|---|---|
| 4,872,543 | A * | 10/1989 | Hinchcliffe | A24C 5/35 131/282 |
| 5,238,122 | A * | 8/1993 | Hart | B65G 1/137 209/555 |
| 5,833,045 | A * | 11/1998 | Osti | A24C 5/35 198/444 |
| 6,840,368 | B2 * | 1/2005 | Betti | B65G 17/46 198/347.3 |
| 7,258,221 | B2 * | 8/2007 | Di Nardo | B65G 47/5122 198/347.3 |
| 2006/0163031 | A1 * | 7/2006 | Perini | B65G 47/5181 198/347.1 |
| 2012/0308348 | A1 * | 12/2012 | Gelli | B65G 47/5109 414/293 |
| 2014/0001008 | A1 * | 1/2014 | Steeber | B65G 47/5127 198/347.1 |
| 2016/0130093 | A1 * | 5/2016 | Hanselman | B65G 17/44 198/347.1 |

* cited by examiner

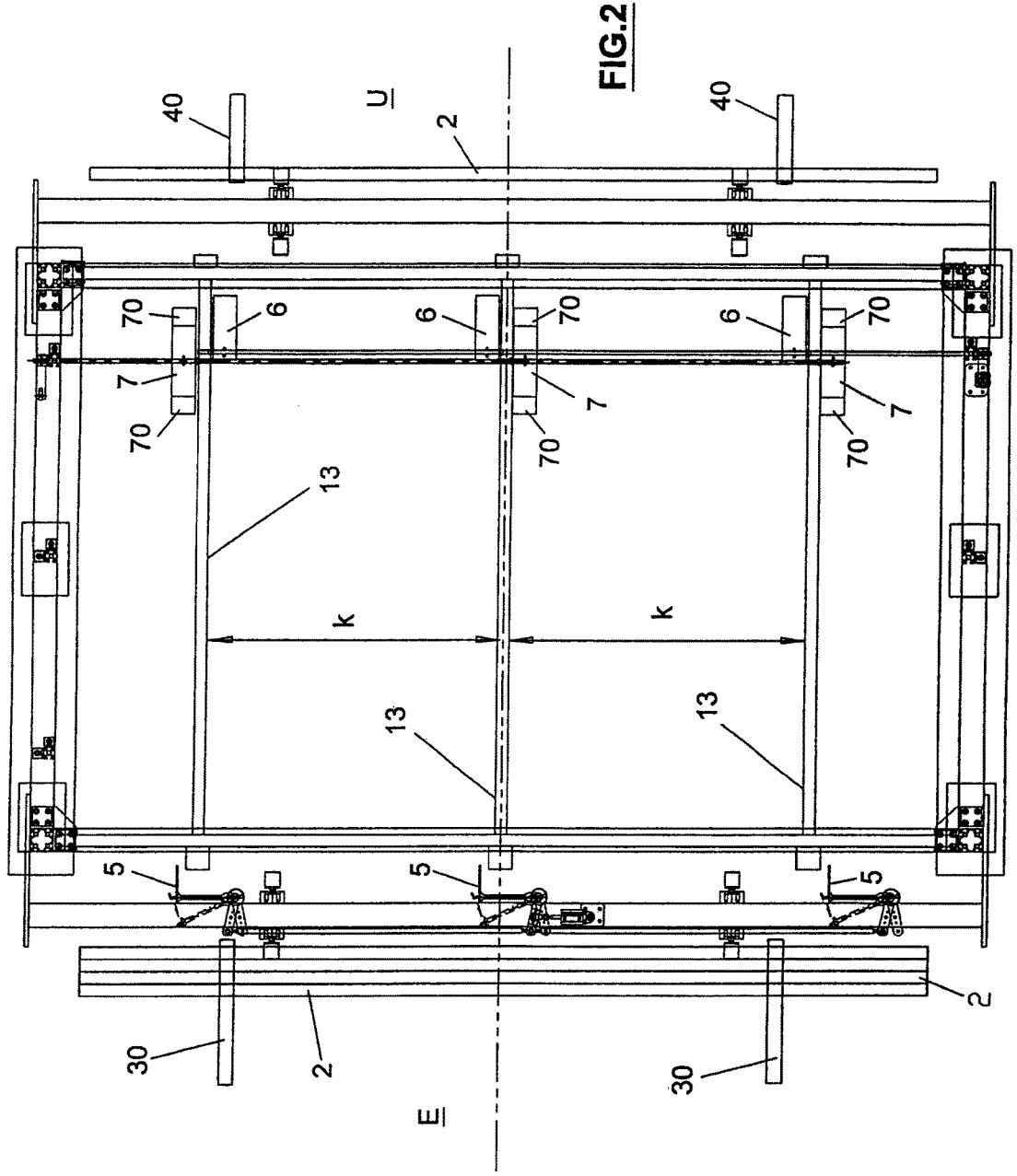

STORING UNIT FOR CARDBOARD TUBES AND METHOD FOR STORING CARDBOARD TUBES

The present invention relates to a storing unit for cardboard tubes used fir manufacturing paper rolls or "logs" and a method for storing cardboard tubes in a storing unit.

It is known that the production of rolls or "logs" of paper material involves the use of cardboard tubes which constitute the so-called "core" of the same rolls. The said tubular cores are produced by machines commonly known as "tube-forming" machines to feed other machines, called "rewinders", in which a predetermined amount of paper is wound on a core to produce a log. To compensate the different capacities of the tube forming machines and the rewinders, a store is interposed between these machines acting as an accumulation tank of the cardboard tubes.

Generally, a storage unit for cardboard tubes provided in paper converting plants comprises a fixed structure with more superimposed planes in which the tubes produced by the tube forming machine are accumulated. Said structure is served, upstream, by a feeding system for the insertion of the tubes in the store unit and, downstream, by a discharge mechanism for discharging the tubes accumulated on the planes of the fixed structure. The insertion of the tubes in the accumulator is a critical stage of the process. In fact, once introduced into the accumulator, if not properly guided, the tubes tend to arrange themselves on the plans of the fixed structure in a disorderly manner, that is, they may lose the initial orientation very easily. This leads to drawbacks both in the tubes accumulation phase and when the tubes are discharged.

JP-56113603 discloses a method for storing metal pipes in a storing unit. The method disclosed in JP-56113603 allows a sequential transferring of more tubes towards a same storing plane of the storing unit. However, JP-56113603 does not teach the simultaneous transferring of more tubes on different planes of the storing unit. The main purpose of the present invention is to propose a storing unit for cardboard tubes that is more reliable in the phase of transfer of the tubes from the tube forming machine and in the discharge phase when the tubes are discharged from the storing unit avoiding, or at least drastically reducing, the possibility that the tubes get stuck on the planes of the storing unit.

This result is achieved, according to the present invention, by adopting the idea of providing a method and a device having the features indicated in the independent claims. Other features of the invention are the subject of the dependent claims.

Among the advantages offered by the present invention there are, in particular, the following: it is always possible to ensure a correct guide of the tubes in the loading and unloading steps, avoiding, or at least drastically reducing, the possibility that the tubes get stuck on the planes of the storing unit; it is possible to achieve this result with a structure that is mechanically simple and relatively inexpensive; it is possible to simultaneously load a plurality of tubes in the storing unit on different planes provided by the storing unit; tubes loaded on different planes of the storing unit can be downloaded at the same time.

These and other advantages and characteristics of the present invention will be best understood by anyone skilled in the art thanks to the following description and to the attached drawings, provided by way of example but not to be considered in a limitative sense, in which:

FIG. 2 is a schematic plan view of the storing unit of FIG. 1;

Figure 1:
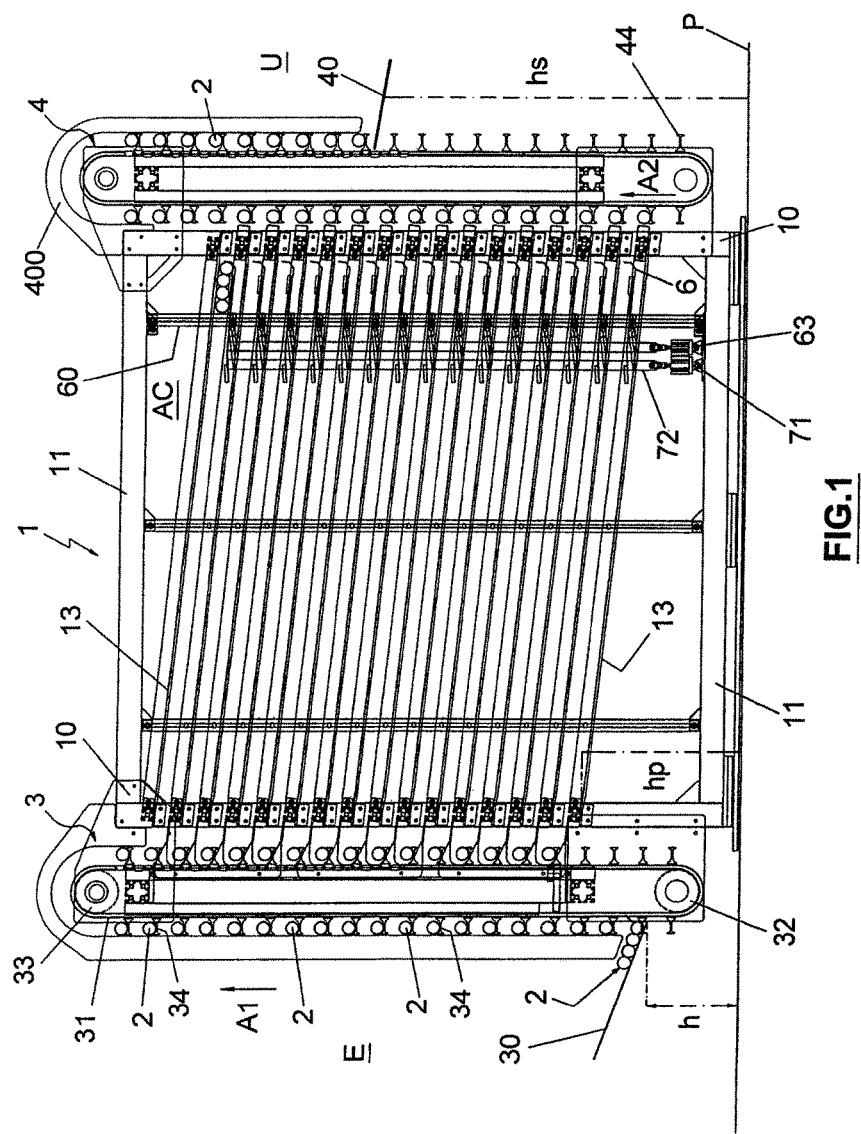
FIG. 1 is a schematic side view of a storing unit for cardboard tubes in accordance with the present invention.
Figure 5:
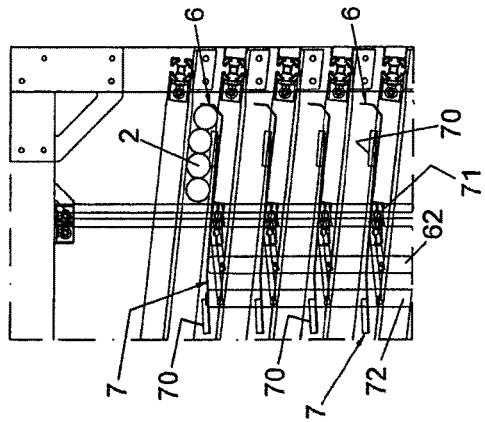
FIGS. 3, 4 and 5 are enlarged details of FIG. 1.
Figure 3:
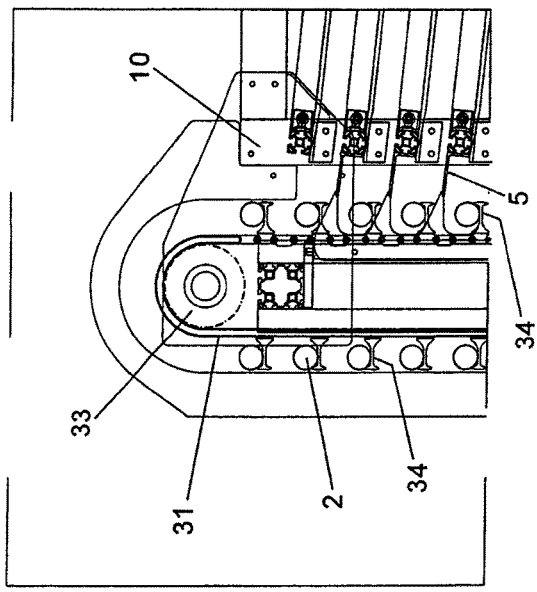
Figure 4:
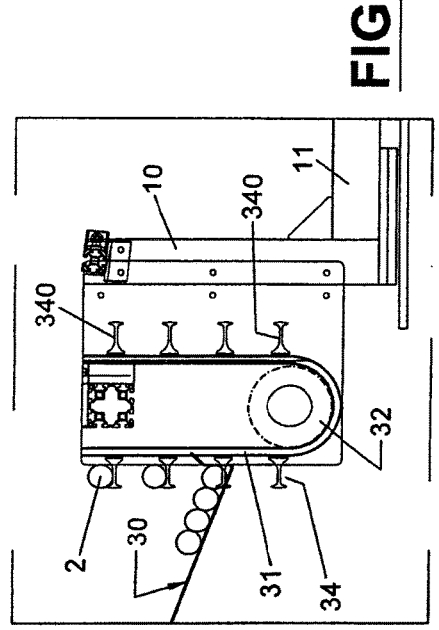
Figure 7:
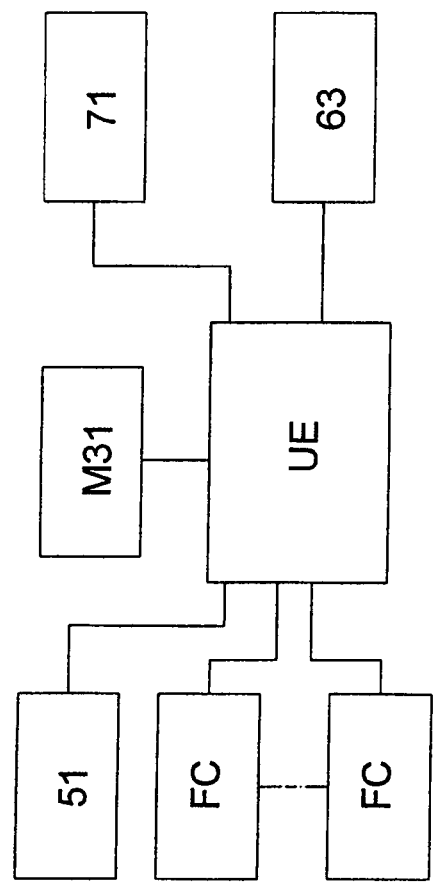
FIG. 7 is a simplified block diagram concerning a control system for controlling the storing unit.

Reduced to its essential structure and with reference to the accompanying drawings, a storing unit (1) for cardboard tubes (2) in accordance with the present invention comprises a structure featuring a fixed frame formed by more uprights (10) joined by upper and lower crosspieces (11). The uprights (10) and the crosspieces (11) delimit a volume inside which are arranged more inclined planes (13) parallel to each other and spaced apart by a predetermined value; each of said planes (13) has an input side (E) higher than the relative output side (U) for the tubes (2). Said inclined planes (13) are fixed and each of them has one end fixed to a corresponding upright (10) of said frame.

The storing unit also has a device (3) for loading the tubes (2) on the said planes (13) and an unloading device (4). The loading device (3) loads the tubes (2), coming sequentially from a tube-forming machine (not shown in the drawings), on the planes (13) from an inlet chute (30) which, in the example of FIG. 1, has its lower end at a height (h), relative to the base (P) on which rests the storing unit (l), lower than the height (hp) of the end of the highest plane (13) nearest to the same base (P). The unloading device (4) moves the tubes (2) from the planes (13) to an outlet chute (40) placed at a predetermined height (hs) with respect to the base (P). It is understood that the heights (h) and (hp) can be of any suitable value.

The loading device (3) comprises two chains (31), one on the right and the other on the left side of the storing unit, which form two vertically elongated rings on corresponding pulleys (32, 33) with horizontal axis, that is, on a bottom pulley (32) and a top pulley (33). Said pulleys (32, 33) are located one (32) at a height lower than the aforementioned height (hp) and the other at a higher level than the plane (13) more distanced from the base (P). With reference to the example shown in FIG. 1, the bottom pulley (32) is approximately at the same height as the lower cross members (11) of the frame, while the top pulley (33) is at a height greater than the upper crosspieces of the same frame. In FIG. 1 is visible a single chain (31) since it is a side view of the storing unit. On said chains (31) there are fixed, at a predetermined distance from each other, more supports (34) which serve to bring the tubes (2) from the inlet chute (30) on the planes (13) as further described in the following. Each of said supports (34) has one side fixed to the chain (31) and protrudes from this, towards the outside of the same chain, orthogonally with respect to the part of the chain to which it is fixed. Furthermore, each of said supports (34) has two opposing concave surfaces (340) on each of which is placed a tube (2) in a horizontal position as further explained below. At each instant, the chains (31) have a vertical side facing the input section (E) for the tubes (2) and a vertical section facing the planes (13).

The chains (31) for loading the tubes (2), with the relative supports (34), are suitably spaced from the planes (13) in such a way that, between the free ends of the supports (34) of the sections facing the planes (13) and the input end (left end in FIG. 1) of the same planes (13) there is a free space. The width of this free space, in the longitudinal direction (left-right direction in FIG. 1), is greater than the diameter of the tubes (2).

Between the loading device (3) and the planes (13) is positioned and acting a first transferring device allowing the transferring of the tubes (2) from the loading device (3) to the planes (13).

Figure 6:
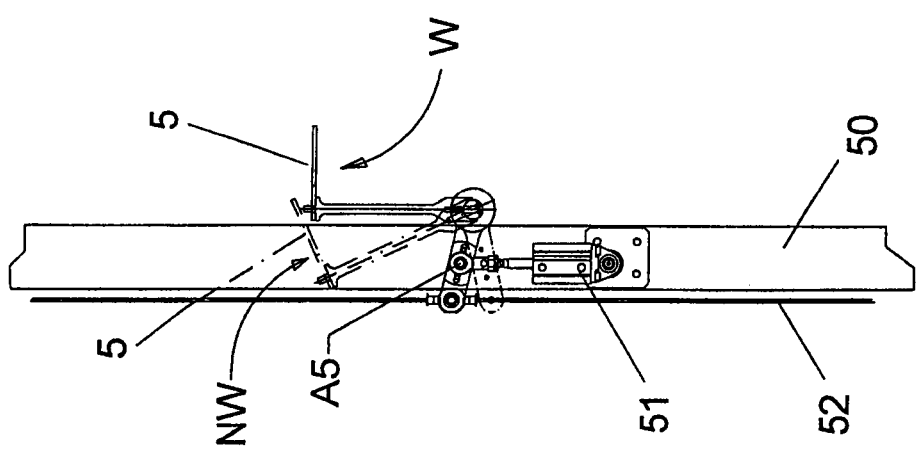
FIG. 6 is an enlarged detail of FIG. 2.

Said first transfer device comprises a plurality of levers (5) hinged on a fixed set of horizontal bars (50) placed in an intermediate position between the loading device and the frame (10, 11). In FIG. 6 the vertical axis of a hinge connecting a lever (5) to a respective bar (50) is indicated with the reference 'A5'. Said bars (50) are vertically spaced from each other by a value corresponding to the distance between the planes (13). With reference to the example shown in FIG. 2, the levers (5) are three in number for each bar (50) and are connected to an actuator (51) by means of a transmission rod (52), so that the same actuator simultaneously controls all the levers (5) of a same bar (50). The levers (5) can assume a retracted or inoperative position (NW) and an extracted or operative position (W). In FIG. 2 and FIG. 6 the retracted position is shown in dashed lines, while the extracted position is represented by a solid line. When the levers (5) are in the extracted position or operative position, they form a series of bridges that connect each tubes support (34) with a corresponding plane (13). Conversely, when the levers (5) are in the retracted or inoperative position, the supports (34) are free to pass in the space between the loading device (3) and the planes (13).

Between the planes (13) and the unloading device (4) there is a transferring device allowing the transferring of the tubes (2) from the planes (13) to the unloading device (4).

Said second transfer device comprises a plurality of blades (6) each of which has a front free end turned towards the unloading device (4) and an opposite rear end hinged to a vertical bar (60). Furthermore, each of the blades (6) is connected, via a rear lever (61) to a vertical rod (62) which is raised or lowered by a corresponding actuator (63). The blades (6) constitute a system of retention of the tubes (2) on the planes (13) and each of them has the front end concave, with the concavity facing the respective rear end. By means of the actuator (63) and the rod (62), the blades (6) are made to rotate so as to raise or lower the respective front concave ends. When the blades (6) are rotated with the front end raised (as in FIG. 1), the tubes (2) present on the planes (13) bear against it, so that their transfer to the unloading device (4) is prevented. Conversely, when the blades (6) are rotated with the front end down, the tubes (2) present on the planes (13) are free to reach the unloading device (4). The unloading device (4) is substantially identical to the loading device (3). In fact, even the unloading device (4) comprises two chains (41), one on the right and the other on the left side of the storing unit, which form two vertically elongated rings on corresponding pulleys (42, 43) with horizontal axis, i.e. a bottom pulley (42) and a top pulley (43). Said pulleys (42, 43) are located respectively at the same heights of the pulleys (32, 33) of the loading device (3). On said chains (41) are fixed, at predetermined distance from each other, more supports (44) which serve to bring the tubes (2) from the planes (13) to the exit chute (40). Each of said supports (44) has one side fixed to the chain (41) and protrudes from this, towards the outside of the same chain, orthogonally with respect to the part of the chain to which it is fixed. Furthermore, each of said supports (44) has two opposing concave surfaces (440) on each of which is placed a tube (2) in the horizontal position. At each instant, the chains (41) have a vertical side facing the section (U) for the exit of the tubes (2) and a vertical section facing the planes (13).

On each of the planes (13) is arranged and acting a lever (7) provided with a pad (70) at each of its ends and connected to an actuator (71) by means of a vertical rod (72). At the same rod (72) are connected more levers (7) so that it can be used only one actuator (71) placed, in the example shown in the figure, in the lower part of the accumulation zone of the tubes (2). The levers (7) are made to rotate clockwise or counterclockwise about respective hinge points (73) with a horizontal axis by means of the vertical translation of the rod (72) driven by the actuator (71). As further described in the following, the levers (7) retain the tubes (2) on the planes (13) and then release them in the unloading phase in synchronism with the machines disposed downstream which use the tubes (2). These levers, as well as the means to synchronize their operation with the machines located downstream, are known to those skilled in the art and, therefore, are not described here in greater detail.

The loading of the tubes (2) on the planes (13) takes place as follows.

The levers (5) are arranged in the retracted position, so as not to interfere with the movement of the supports (34) in the space between the loading device (3) and the planes (13). The chains (31) are made to move, as indicated by arrow "A1" in FIG. 1, so that on each support (34) is placed a tube (2) coming from the inlet chute (30). The movement of the chains (31) continues to have a predetermined number of tubes (2) each at a level slightly higher than that of the inlet end (upper end) of a corresponding plane (13). At this point, the levers (5) are extracted and the movement of the chains (31) is slowed down, whereby the tubes (2) are intercepted by the levers (5) which, forming a bridge between the loading device (3) and the planes (13), determine the transfer of the tubes (2) by gravity on the planes (13). As the transfer of the tubes (2) by the chain (31) to the planes of accumulation (13) takes place with a reduced speed, the same transfer phase is more reliable because the contact between the tubes (2) and the levers (5) is devoid of significant bumps and, therefore, the tubes (2) tend to keep their initial orientation. Once the transfer is complete, the movement of the chains (31) goes on again with higher speed. The greater time taken to procure the transfer with reduced speed of the tubes from the chains (31) on the planes (13) is compensated, however, by the fact that the transfer involves simultaneously a plurality of tubes (2). In practice, in a single step there is the simultaneous loading of several planes (13).

The tubes (2) then accumulate one behind the other on the planes (13). In the accumulation phase of the tubes (2) on the planes (13), the blades (6) are raised. In this phase, the concave front ends of the blades the (6) act as retention element for the tubes (2).

The unloading of the tubes (2) from the planes (13) takes place as follows.

The blades (6) are lowered, while the chains (41) are set in motion as indicated by arrow "A2" in FIG. 1. In this phase, the supports (44) anchored to the chains (41) receive the tubes (2) and carry them up to the exit chute (40) to permit their use by the machines located downstream of the storing unit. In the transition from the planes (13) to the exit chute (40), the tubes (2) move along a trajectory which leads them in an area where there is provided a guide (400). The levers (7), in a manner known per se, have the task of holding the tubes (2) upstream of those downloaded on the chains (41).

From the foregoing description it is evident that in storage unit for cardboard tubes in accordance with this invention there is the simultaneous transfer of a plurality of tubes (2) from a feeding mechanism (in the example above, the loader with the chains 31) to a plurality of storage planes (13). It is also evident that the simultaneous transfer of the tubes to the plurality of planes of the storing unit allows to operate the same transfer at a reduced speed, with all the advantages mentioned above.

For this purpose, the means for transferring the tubes (2) from the input section (E) of the storing unit to the accumulation section (AC) are programmed to intervene when the chains (31) have a plurality of tubes (2) to a height slightly greater than that of the inlet end of the planes (13). Moreover, advantageously, the electric motor (M31) which drives the chains (31) is programmed to slow their run before the operation of said transfer means. The control of the position of the tubes (2) transported by the chains (31) can be performed, for example, arranging a series of photocells (FC) near the input side of each plane (13). A programmable electronic control unit (EU) controls said actuators and receives the signals of the photoelectric cells (FC) and the timing signals coming from the machines located downstream that use the tubes (2).

A method for storing cardboard tubes (2) in a storing unit according to the present invention therefore comprises the following steps:

providing a storage unit with an input section for the tubes (2), a storage section (AC) comprising a plurality of storing planes (13), an output section for the tubes (2), transfer means (3) for transferring the tubes (2) from the input section to the storage section, and discharge means for conveying the tubes (2) from the storing section to the output section;

providing a plurality of cardboard tubes (2) in the input section (E) of said storage unit;

transferring the tubes (2) from the input section of the storage unit to the storage section;

storing a plurality of tubes (2) in said storage section (AC);

transferring the tubes (2) from said storage section (AC) to said output section.

Advantageously, the step of transferring the tubes (2) from said input section to said storage section involves more tubes (2) simultaneously, whereby a plurality of tubes (2) are transferred from said input section simultaneously on a plurality of storing planes (13) of said storage section (AC).

In addition, advantageously, the step of transferring the tubes (2) from said input section to said storage section (AC) is executed with lower speed compared to a previous step in which the tubes (2) are carried by the input section of the storage unit to a predetermined transferring position, and the transferring step takes place by actuating the said transfer means when said speed is lowered.

In practice the details of execution may vary in any equivalent way as for what concerns the arrangement and the conformation of the individual elements described or illustrated, without thereby departing from the scope of the adopted solution and thus remaining within the limits of the protection conferred by this patent.

The invention claimed is:

1. A method for storing cardboard tubes in a storage unit, the method comprising the following steps:

providing a storage unit comprising an input section for the cardboard tubes, a storage section comprising a plurality of storing planes on which the cardboard tubes are stored, an output section for the cardboard tubes, a transfer means for transferring the cardboard tubes from the input section to the storage section, and a discharge means for conveying the cardboard tubes from the storage section to the output section;

providing a plurality of the cardboard tubes in the input section of said storage unit;

transferring the cardboard tubes from the input section of the storage unit to the storage section;

storing a plurality of the tubes in said storage section;

transferring the cardboard tubes from said storage section to said output section, wherein transferring the cardboard tubes from said input section to said storage section involves transferring more cardboard tubes simultaneously, whereby a plurality of the cardboard tubes are transferred from said input section simultaneously on a plurality of storing planes of said storage section.

2. A method according to claim 1, wherein transferring the cardboard tubes from said input section to said storage section is executed with lower speed compared to a previous step in which the cardboard tubes are carried by the input section of the storage unit to a predetermined transferring position, and transferring the cardboard tubes from said input section to said storage section takes place by actuating said transfer means when a speed is lowered.

3. A method according to claim 1, wherein the cardboard tubes are conveyed sequentially to said transfer means.

4. A storage unit for storing cardboard tubes, the storage unit comprising:

an input section for the cardboard tubes;

a storage section comprising a plurality of storing planes on which the cardboard tubes can be stored;

an output section for the cardboard tubes;

a transfer means for transferring the cardboard tubes from the input section to the storage section;

a discharge means for conveying the cardboard tubes from the storage section to the output section; and a programmable unit for controlling at least said transfer means, said programmable unit being programmed to automatically perform a method comprising:

providing a plurality of the cardboard tubes in the input section of said storage unit;

transferring the cardboard tubes from the input section of the storage unit to the storage section;

storing a plurality of the tubes in said storage section;

transferring the cardboard tubes from said storage section to said output section, wherein transferring the cardboard tubes from said input section to said storage section involves transferring more cardboard tubes simultaneously, whereby a plurality of the cardboard tubes are transferred from said input section simultaneously on said plurality of storing planes of said storage section.

5. A storage unit according to claim 4, wherein said transfer means comprises a plurality of levers that can be positioned in an extracted or operative position and respectively in a retracted or inoperative position.

6. A storage unit according to claim 4, wherein said storage section comprises a plurality of inclined tube storing planes, said inclined planes having a higher input side and a lower output side.

7. A storage unit according to claim 4, wherein the discharge means comprises a plurality of blade structures mounted to a support structure and an actuator for moving the support structure, wherein each of the blade structures moves from one of a raised position and a lowered position to another one of the raised position and the lowered position upon the actuator moving the support structure in a vertical direction.

8. A storage unit according to claim 4, wherein the discharge means comprises a plurality of blade structures mounted to a support structure and an actuator for moving the support structure, wherein each of the blade structures moves from one of a raised position and a lowered position to another one of the raised position and the lowered position upon the actuator moving the support structure.

9. A storage unit according to claim 4, wherein the transfer means comprises a plurality of levers, a lever support structure and an actuator, each of the levers being connected to the lever support structure, each of the levers being simultaneously moved from one of a retracted position to an operative position to another one of the retracted position and the operative position via the actuator.

10. A storage unit according to claim 9, wherein each of the levers bridges a space between the transfer means and the storage section in the operative position.

11. A method according to claim 1, wherein the discharge means comprises a plurality of blade structures mounted to a support structure and an actuator for moving the support structure, wherein each of the blade structures moves from one of a raised position and a lowered position to another one of the raised position and the lowered position upon the actuator moving the support structure in a vertical direction.

12. A method according to claim 1, wherein the discharge means comprises a plurality of blade structures mounted to a support structure and an actuator for moving the support structure, wherein each of the blade structures moves from one of a raised position and a lowered position to another one of the raised position and the lowered position upon the actuator moving the support structure.

13. A method according to claim 1, wherein the transfer means comprises a plurality of levers, a lever support structure and an actuator, each of the levers being connected to the lever support structure, each of the levers being simultaneously moved from one of a retracted position to an operative position to another one of the retracted position and the operative position via the actuator.

14. A method according to claim 13, wherein each of the levers bridges a space between the transfer means and the storage section in the operative position.

15. A storage unit for storing cardboard tubes, the storage unit comprising:
an input section for the cardboard tubes;
a storage section comprising a plurality of storing planes on which the cardboard tubes can be stored;
an output section for the cardboard tubes;
a transfer device, the transfer device comprising a plurality of levers connected to a lever support structure and a lever actuator comprising an actuator transmission mechanism, the actuator transmission mechanism being connected to the lever actuator and each of the plurality of levers, wherein each of the levers simultaneously moves from one of an operative position and a retracted position to another one of the operative position and the retracted position via the lever actuator, each of the levers in the operative position bridging a gap between the input section and the storage section, wherein a plurality of the cardboard tubes are transferred from the input section simultaneously on the plurality of storing planes of the storage section when the levers are in the operative position;
a discharge device comprising a discharge device support structure, a plurality of blade structures and a support structure actuator, each of the plurality of blade structures being connected to the discharge device support structure, each of the plurality of blade structures simultaneously moving from one of a raised position and a lowered position to another one of the raised position and the lowered position when the discharge device support structure is actuated via the support structure actuator.

16. A storage unit according to claim 15, wherein the cardboard tubes stored in the storage section move from the storage section to the discharge device when the plurality of blade structures are in the lowered position.

17. A storage unit according to claim 15, wherein the cardboard tubes stored in the storage section are prevented from being discharged from the storage section when the plurality of blade structures are in the raised position.

* * * * *